United States Patent
Kozlov et al.

(10) Patent No.: US 11,402,106 B2
(45) Date of Patent: Aug. 2, 2022

(54) SELF-POWERED WATER HEATER

(71) Applicant: GAS TECHNOLOGY INSTITUTE, Des Plaines, IL (US)

(72) Inventors: Aleksandr Kozlov, Buffalo Grove, IL (US); David Kalensky, Chicago, IL (US); Mark Khinkis, Morton Grove, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 104 days.

(21) Appl. No.: 16/832,158

(22) Filed: Mar. 27, 2020

(65) Prior Publication Data
US 2020/0309385 A1    Oct. 1, 2020

Related U.S. Application Data

(60) Provisional application No. 62/824,412, filed on Mar. 27, 2019.

(51) Int. Cl.
| | | |
|---|---|---|
| *F24D 17/00* | (2022.01) | |
| *F24D 17/02* | (2006.01) | |
| *F24H 1/10* | (2022.01) | |
| *F23D 14/12* | (2006.01) | |
| *F24H 8/00* | (2022.01) | |

(52) U.S. Cl.
CPC ......... *F24D 17/0036* (2013.01); *F23D 14/12* (2013.01); *F24D 17/02* (2013.01); *F24H 1/107* (2013.01); *F24H 8/00* (2013.01); *F24D 2200/123* (2013.01); *F24D 2200/32* (2013.01); *F24H 2240/08* (2013.01)

(58) Field of Classification Search
CPC ..................................................... F22B 27/00
See application file for complete search history.

(56) References Cited

U.S. PATENT DOCUMENTS

| | | | |
|---|---|---|---|
| 4,517,807 A | * | 5/1985 | Harnish ................. F24D 17/02 165/241 |
| 5,495,829 A | | 3/1996 | Jayaraman et al. |
| | | | (Continued) |

FOREIGN PATENT DOCUMENTS

GB    2 451 521 A    2/2009

OTHER PUBLICATIONS

Qiu, K. et al., "Development of Thermoelectric Self-Powered Heating Equipment," J of Electronic Materials, 2011, vol. 40, No. 5, pp. 606-610.

(Continued)

*Primary Examiner* — Steven B McAllister
*Assistant Examiner* — John E Bargero
(74) *Attorney, Agent, or Firm* — Pauley Erickson & Swanson

(57) ABSTRACT

A gas-fired instantaneous water heater including a thermoelectric generator (TEG) and a heat pump that is powered by the TEG to improve efficiency compared to existing water heaters. Water to be heated is circulated through the heat pump, TEG heat exchanger, and primary heat exchanger to produce a stream of heated water. An adjustable firing rate permeable matrix radiant burner is included, in which natural gas and air are combusted to produce combustion products, including heat. The combustion products are condensed in a condensing system to produce cooled and dry exhaust gas.

18 Claims, 2 Drawing Sheets

(56) References Cited

U.S. PATENT DOCUMENTS

| | | | |
|---|---|---|---|
| 8,904,808 B2 | 12/2014 | Ghoshal et al. | |
| 2014/0230869 A1 | 8/2014 | Chen et al. | |
| 2017/0021697 A1* | 1/2017 | Oh | B60H 1/00335 |
| 2018/0135869 A1* | 5/2018 | Fard | F24D 12/02 |

OTHER PUBLICATIONS

Ghoshal, U., "Heat Pump Water Heater Using Solid-State Energy Converters," DOE EERE, 2016 Bldg. Tech Office Peer Review, Virginia, Apr. 4-7, 2016, 18pp.

* cited by examiner

SELF-POWERED WATER HEATER

CROSS-REFERENCE TO RELATED APPLICATION

This application claims the benefit of U.S. Provisional Patent Application Ser. No. 62/824,412, filed on 27 Mar. 2019. The Provisional patent application is hereby incorporated by reference herein in its entirety and is made a part hereof, including but not limited to those portions which specifically appear hereinafter.

BACKGROUND OF THE INVENTION

Field of the Invention

This invention generally relates to water heaters and, more particularly, to improved performance and construction of gas-fired water heaters. The invention includes self-powered operation of a water heater, excess power generation using a thermoelectric generator, radiant burner, combustion chamber, heat exchanger and heat exchange tube constructions, heat pump, a condensing system, and performance with particular emphasis on achieving ultra-high efficiency and reducing pollutant emissions.

Description of Related Art

There are no known existing or emerging technologies for gas-fired water heaters with excess power. The current state-of-the-art for conventional water heaters include gas condensing water heaters (instantaneous and storage) and emerging gas heat pump water heaters (HPWH). Depending on the model, these all generally provide high efficient operation and have reduced pollutant emissions to meet current regulations, but they unfortunately cannot, for example, provide operation during a power outage.

Conventional gas-fired water heaters typically require an electric grid connection for parasitic power (e.g., igniter, fan, control, gas valve, etc.). In 2017, there were over 3.5 thousand reported outages impacting 36.2 million households. Puerto Rico experienced the most severe outage where after 3 months power had been restored to only 55% of the island residents. No area of the country, however, is immune to multiple days of outages. While gas HPWHs generally offer superior efficiency, they require large storage tanks to operate, have a large footprint, and use electric resistance during peak usage. A 2017 gas utility survey on self-powered water heating found that 8% of the areas with existing gas water heaters could not afford larger diameter tanks. In addition, 22% did not have access to a nearby electric outlet. With the average cost of an electrical hook-up adding $275 to the cost of installation, the gas HPWH and other current state-of-the-art gas options become less attractive and uneconomical. There are 59.5 million gas water heaters in U.S. homes of which 88%, or 52.4 million, are non-powered, having no electrical connection.

Self-powered gas-fired equipment for water heating using thermoelectric devices to generate power for self-powered operation are being developed. The systems, however, are not very efficient and require further, potentially extensive, development. Existing heat pump water heaters are primarily electrically powered. Gas heat pump water heaters, while having high efficiency, are not self-powered and cannot operate during a power outage.

Thus there is a need and demand for a high efficiency and low cost thermoelectric device that may be developed and commercialized to make water heaters more cost effective. There is a further need and demand for self-powered instantaneous water heaters that can operate during a power outage, have ultra-low pollutant emissions and have a primary (or source) coefficient of performance (COP) greater than 1.0.

SUMMARY OF THE INVENTION

The subject invention is directed to overcoming some or all of these limitations or shortcomings.

To that end and in accordance with one aspect of the subject invention there is provided a thermoelectric generator device that can generate enough electric energy to power a gas-fired condensing instantaneous water heater and have excess power capacity for increased efficiency or external use. A water heater in accordance with one aspect of the invention utilizes an advanced combustion system design with a low-cost radiant permeable matrix burner that in testing showed ultra-low emissions (≤5 ppmv NOx, ≤10 ppmv CO at 3% O2), ultra-high efficiency and reliability.

In accordance with another specific aspect of the invention, there is provided a natural gas-driven instantaneous water heater for cost effective self-powered operation with ultra-high efficiency and ultra-low emissions. Attractive features of the instantaneous water heater design of this invention include: the ability to operate entirely on natural gas combustion with no need for externally generated electricity and, during a power outage, the ability to provide excess power for increased efficiency or external use. Achieving the above goals has required advances in gas-driven instantaneous water heater technology including: a thermoelectric generator (TEG) and designs targeted to maximize generated power and lower costs, a design of an instantaneous water heater incorporating a heat pump powered by the TEG, a natural gas burner, heat exchanger designs, enhanced condensing systems and a battery storage or capacitor to operate the water heater in stand-by mode and when it starts.

Embodiments of this invention include a self-powered natural gas driven instantaneous water heater with a TEG that can generate enough electric energy to operate the water heater and a heat pump for ultra-high efficiency. The water heater efficiency is projected to be >1.1 EF (Energy Factor) with a source COP>1.0 for a cost-effective unit compared to the state-of-the-art or existing typical new technologies for electric water heaters which have a 1.09 EF (source COP=0.32) and gas water heaters with a 0.87 EF (source COP=0.8).

Embodiments of this invention include a gas-fired instantaneous water heater including a TEG and a heat pump that is powered by the TEG where water is circulated through the heat pump to result in a heated stream of water. This aspect of the subject invention also includes an advanced adjustable firing rate permeable matrix radiant burner in which natural gas and air are combusted to produce various combustion products, including heat, and a condensing system where the combustion products condense water vapor when the water vapor is first cooled by the water heated by the heat pump, and then, cooled by the air cooled by the heat pump. This aspect of the subject invention also includes a combustion chamber which is exposed to radiation from the radiant burner. The combustion chamber has a cold side cooled by cold water entering the water heater, and also a hot side heated by radiation from the radiant burner. The radiant burner may be adjusted with a firing rate ranging from 10 to 1.

One embodiment of the subject invention involves a gas-fired instantaneous water heater that includes a radiant burner and a thermoelectric generator (TEG) in combination with the radiant burner. The TEG receives water entering the water heater, the TEG is heated by the radiant burner, and the TEG provides operative power to components of the water heater. The gas-fired instantaneous water heater also includes the TEG comprising a first section configured to receive water entering the water heater, and a second section disposed toward the burner, wherein the first section is cooled by water entering the water heater, and the second section is heated by radiation from the radiant burner. The gas-fired instantaneous water heater further includes a heat pump in combination with the TEG wherein the TEG is configured to power the heat pump, wherein the heat pump operates on a heat transfer medium, such as refrigerant, which transfers thermal energy from ambient air to water. The heat pump also includes a compressor, wherein the compressor is configured to generate heat, a condenser wherein the condenser is configured to receive water entering the water heater or water from other components of the water heater, an expansion valve that is configured to lower the refrigerant pressure for further heat absorption from ambient air, and an evaporator configured to receive ambient air. The gas-fired instantaneous water heater also includes a combustion chamber that is exposed to radiation from the radiant burner. The TEG at least partially surrounds the combustion chamber. In this embodiment of the subject invention the radiant burner has a high power density of up to about 100 W/cm2. The radiant burner also has a low access air of about 20% or less. The water heater has pollutant emissions in NOx of about 5 ppm or less and CO of about 10 ppm or less where the NOx and CO pollutant emissions are normalized at 3% of O2.

Yet another aspect of the subject invention includes a water heater with a TEG where elements of the TEG are incorporated in a water-cooled wall of the combustion chamber. The heat pump heats water in a water loop of the water heater. The radiant burner exposes the combustion chamber to infrared radiation, and a condensing system.

Additional embodiments of the invention include a water heater with a radiant burner and a thermoelectric generator (TEG) in combination with the radiant burner, wherein a first side of the TEG receives water to be heated by the water heater, a second side of the TEG is heated by the radiant burner, and the TEG provides operative power to components of the water heater. The water heater also includes a heat pump in combination with the TEG, wherein the heat pump is configured to heat the water upstream of the TEG. The heat pump includes a compressor and an expansion valve. The heat pump further includes a condenser that receives water and an evaporator that can receive ambient air. The heat pump is powered by the TEG. TEG elements are incorporated with a combustion chamber, where the TEG at least partially encloses the combustion chamber. The radiation from the burner heats the TEG. The TEG is further heated by convection from products of the combustion chamber. The water heater of this aspect of the subject invention produces about 660 We of electric power. About 100 We of the electric power is used for powering the water heater. The remaining about 560 We of electric power is used to power the heat pump.

The invention further includes a method of operating a self-powered water heater. The method includes introducing a first supply of water to the water heater, heating the first supply of water with a heat pump operating in conjunction with the water heater. The heat pump includes at least one water heating coil as part of the heat pump condenser. The method further includes transferring the first supply of heated water to a thermoelectric generator (TEG) heat exchanger wherein a natural gas burner integrated with the TEG heat exchanger further heats the first supply of heated water resulting in a second supply of heated water. The second supply of water is heated to a higher temperature than the first supply of water. The method then includes transferring the second supply of heated water to a primary heat exchanger wherein the combustion products from the gas burner heats the second supply of heated water resulting in a third supply of heated water. The temperature of the third supply of heated water is greater than the temperature of the second supply of heated water. The method also includes a condensing system downstream from the primary heat exchanger. The condensing system is the heat pump water heat exchanger together with an exhaust gas pipe downstream from the heat pump water heat exchanger. The method also includes the TEG heat exchanger providing power to components of the water heater. The TEG heat exchanger provides a transfer of heat amongst the first, second and third supplies of heated water.

To achieve the subject objectives, it has been desirable or necessary to use one or more of the following: a) an efficient and low cost TEG to generate power from heat of fuel combustion, b) a new high efficiency and low-cost burner which is optimized and suitable to work with the TEG, and c) an adaptation of an existing heat pump design for the instantaneous water heater. Other objects and advantages will be apparent to those skilled in the art from the following detailed description taken in conjunction with the appended claims and drawings.

BRIEF DESCRIPTION OF THE DRAWINGS

Objects and features of this invention will be better understood from the following description taken in conjunction with the drawings, wherein.

DETAILED DESCRIPTION

This invention relates generally to water heaters and, more particularly, to improved performance and construction for gas-fired water heaters. Particular areas of focus include self-powered operation of a water heater, excess power generation using a thermoelectric generator (TEG), radiant burner, combustion chamber, heat exchangers and heat exchange tube constructions, a heat pump and performance with particular emphasis on reducing pollutant emissions.

Figure 1:
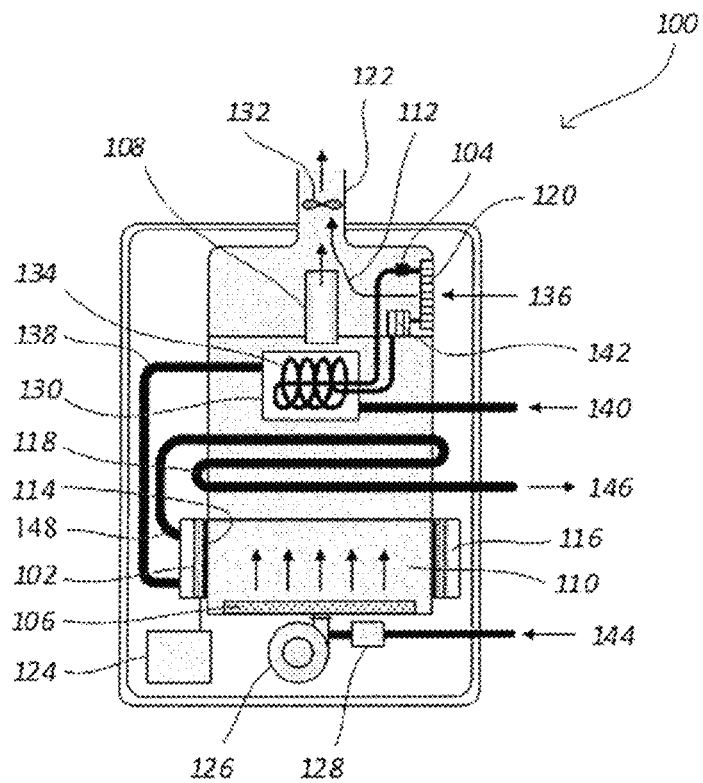
FIG. 1 is a schematic of a self-powered water heater in accordance with one embodiment of the invention.

The present invention contemplates a new and improved instantaneous water heater 100 construction with source coefficient of performance (COP) greater than 1.0, which can operate during a power outage, while being cost-effective and with ultra-low pollutant emissions. The COP is defined as the ratio of useful energy output divided by energy input. A gas-fired instantaneous water heater 100 in accordance with one preferred embodiment contains components that make the water heating technology novel, cost effective, reliable, and competitive. As shown in FIG. 1, the gas-fired instantaneous water heater 100 includes: a thermoelectric generator (TEG) 102, a heat pump powered by the TEG 102, an adjustable firing rate permeable matrix radiant burner 106, a primary heat exchanger 118, and a condensing system including a heat pump water heat exchanger 130 together with an exhaust gas heat exchanger 108. The heat pump includes a compressor 142 powered by the TEG 102, a condensing system including the exhaust gas heat exchanger 108 and a water heat exchanger 130, expansion valve 104 and an air heat exchanger or evaporator 120. The heat pump evaporator 120 uses incoming ambient air 136 as a heat source in conjunction with a heat pump hot coil 134. The compressor 142 works in conjunction with the heat pump to generate additional heat for the water heater 100. Additional heat exchangers may be used, including at least one heat pump water heat exchanger 130 whereby water is used as a heat sink. The condensing system 130, 108 receives unheated or cool water 140 entering the water heater as an inlet for the heat pump water heat exchanger 130. Additionally, some embodiments of the invention may further include a battery storage 124 or capacitor and additional components such as an air blower 126, a gas valve 128, an exhaust pipe 122, and/or an exhaust gas fan 132 that utilize a natural gas 144 source. Such components may be present or not present in various embodiments of the instantaneous water heater 100 according to this invention.

In some embodiments, the water heater 100 can contain a small water tank as part of the heat pump water heat exchanger 130. The small water tank may be about 2 to 5 gallons in capacity. The TEG 102 desirably generates enough electric energy to power the water heater 100 and produce excess power. The various components of the water heater 100 may contain several sides or walls where the components of the water heater 100 can interact with each other. In one such embodiment, as shown in FIG. 1, elements of the TEG 102 are preferably incorporated in a first side water-cooled wall 116 of the TEG 102. This water-cooled wall 116 or first side of the TEG 102 works in conjunction with a combustion chamber 110 also within the water heater 100. The combustion chamber 110 is exposed to an intense infrared radiation that comes from the radiant burner 106 (also shown in FIG. 3). The water-cooled first side 116 of the TEG 102 aids to maintain a manageable temperature in the combustion chamber 110 to combat the high level of heat from the radiation. The design of the combustion chamber 110 provides an ultra-high efficient operation of about greater than or equal to 95 Uniform Energy Factor (UEF). There is also a hot side or second side 114 of the TEG 102 device that is preferably heated by the radiation. The first side or first section 116 of the TEG 102 device is preferably cooled by cold water entering the water heater 100. Water flows on the water-cooled first side 116 of the TEG 102 only. The water cools the TEG 102 from the first side or section 116 while the burner 106 heats the TEG 102 from the second side or section 114. The temperature difference between the hot side 114 and cold side 116 of the TEG 102 creates electrical energy for the water heater 100. The heat pump heats water in a water loop 138, 140 of the water heater. The hot side 114 and cold side 116 of the TEG 102 aid to maintain an overall optimum operating condition of the water heater 100 by circulating water in the water loop 118 from a TEG outlet 148.

As shown in FIG. 1, the cold or unheated water inlet 140 is first directed to the heat pump water heat exchanger 130 where the water is slightly preheated by the heat pump via the hot coil 134 as a condenser, resulting in a first heated water supply. In one embodiment, the water is heated by several degrees Celsius. The preheated water may then move to the TEG 102, to create a second supply of heated water, and finally to a primary heat exchanger 118 to result in a third supply of heated water 146 which may be directed for use outside the water heater 100. By directing cold water to the heat pump water heat exchanger 130 first, performance of the heat pump is increased. The lower the temperature of the water entering the heat pump and the less the water is heated by the heat pump, the higher performance of the heat pump. In conventional heat pump water heaters cold water is preheated to about 120-140° F. by the heat pump. In such water heaters the heat pump average coefficient of performance (COP) is about 3.0. In one embodiment of the claimed invention, cold water may be heated by several degrees Celsius. In one embodiment, the water may be heated by about 2-8° C. (or about 4-14° F.) by the heat pump water heat exchanger 130 with the heat pump having a COP of much greater than 3.0, such as a COP of 15. The COP of the heat pump in embodiments of this invention may also be much higher such as a COP of 30. The COP may be limited by the Carnot cycle with the heat pump able to achieve a COP of up to about 60.

In accordance with one preferred embodiment of the subject invention, the adjustable firing rate burner 106 is developed to provide a high heat transfer rate from combustion products. The burner 106 may then transfer heat to the TEG 102 to produce more electrical power and make the TEG 102 even more efficient. This is further shown in FIG. 2 whereby natural gas 144 enters the water heater 100, to the TEG 102 and then progresses through the heat pump to distribute heated water while also showing electric power consumption. The heated water from the TEG 102 and heat pump may be partially used for hot water energy, while some is also exhausted as heat loss. One example of the water heater operating conditions is shown in the table below in addition to FIG. 2.

TABLE 1

Water temperatures and heat flows in the instantaneous water heater (water flow rate 5 GPM, water heater COP = 1.11)

| Locations (correspond to FIG. 1) | | Heat pump inlet (140) | Heat pump outlet (138) | TEG outlet (148) | Hot water outlet (146) |
|---|---|---|---|---|---|
| Temperature | ° C./° F. | 5.3/41.5 | 11.6/52.9 | 21.6/70.9 | 60/140 |
| Water heat flow | kW/Btu/hr | 0/0 | 8.432/28,767 | 12.58/42,921 | 58.619/200,000 |

Figure 3:
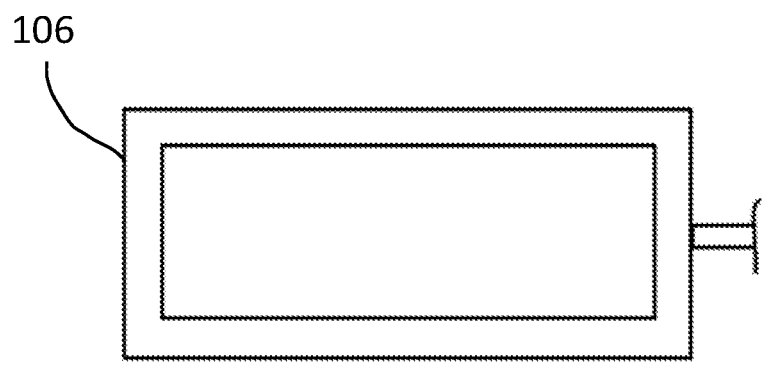
FIG. 3 is a radiant burner that may be incorporated into the self-powered water heater according to the embodiment of FIG. 1.

The embodiment as shown in Table 1 is but one example of the operations of the subject water heater. The temperature and water heat flow values may vary depending on cold water temperature and flow rate, water heater capacity, TEG efficiency and heat pump performance. This also means the radiant burner 106 can desirably operate at a wide range. The range of the burner 106 can vary from about 10 to 1 in terms of turndown ratio. Turndown ratio is the ratio of maximum fuel input rate to the minimum fuel input rate of a modulating and sectional burner. The radiant burner 106 also has a high-power density that may range up to about 100 W/cm2. The burner 106 provides low access air of about less than 20% and provides ultra-low pollutant emissions. For example, the pollutant emissions of NOx with the radiant burner 106 is about less than 5 ppm and CO emissions of about less than 10 ppm at about 3% O2. Standard burners used in tankless water heaters cannot be adapted for the purpose of the subject invention as heat transfer from combustion products of standard burners is limited by convection. The radiant burner 106 of this embodiment, as shown in FIG. 3, provides high radiant flux to the TEG 102.

Figure 2:
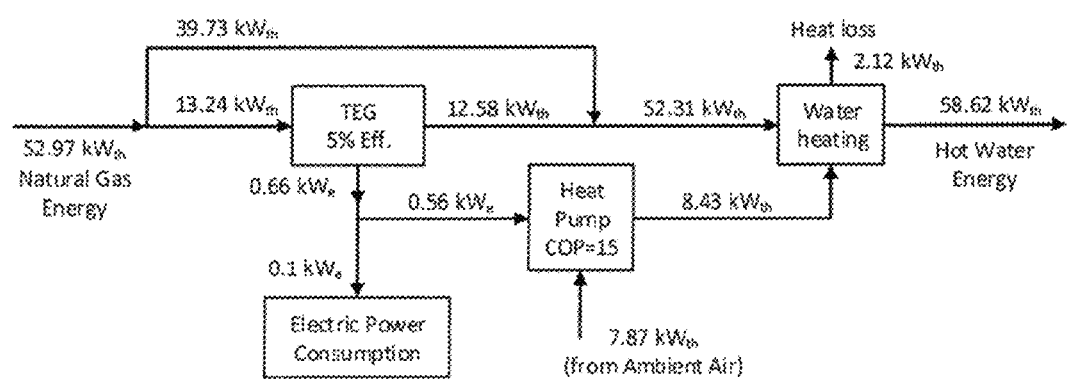
FIG. 2 is a flow diagram of power balance of the self-powered water heater according to the embodiment of FIG. 1.

As an example of the water heater 100 operation, the TEG 102 may produce 660 We power, from that, 100 We may be used for powering the water heater 100 (which may comprise the combustion air blower 126, gas valve 128 and exhaust fan 132, for example) and 560 We is used to power the heat pump compressor 142 for increased performance of the water heater 100. If the heat pump has a coefficient of performance (COP) of about 15, then the water receives about upwards of 8.43 kWth of heat or thermal energy from the heat pump. In general, the TEG 102 can produce from about 100 We to several kWe depending on the water heater 100 capacity. High efficiency of the heat pump will cost-effectively provide an overall efficiency of the water heater 100 of about at least 1.1 energy factor (EF), where EF is the water heater's energy factor calculated as the ratio of energy the water heater 100 puts to use, divided by the total amount of energy that goes into powering the unit. In this embodiment the EF may work with a source COP of about greater than 1.0. This is also shown in the schematic of FIG. 2 illustrating a power balance of the self-powered tankless water heater 100.

In accordance with one embodiment, an advanced self-powered gas instantaneous water heater 100 with source COP greater than 1.0 is provided which can operate during a power outage, while being cost-effective and meeting the most stringent emissions requirements in compliance with South Coast Air Quality Management District (SCAQMD), Rule 1121. An instantaneous water heater 100 design in accordance with another embodiment of the subject invention may also be condensing, with the combustion products being exhausted cooled and dried, and with no freezing issue. The advanced exhaust gas condensation is achieved by a two-stage condensing system 130, 108 where water vapor is condensed, at first, from the combustion products flowing around the heat pump water heat exchanger 130 and then, from an exhaust gas in an exhaust gas heat exchanger 108 streamlined by cooled ambient air 112 coming from the heat pump cooling circuit, or evaporator 120. Thus, the cooled ambient air 112 used for the heat pump as a heat source is not exhausted into a building, but is instead used for increased condensation and improved efficiency of the water heater 100. Moreover, mixing air with cooled and dried exhaust gas will prevent further condensing in an exhaust pipe 122 and/or chimney as well as eliminating plumes of water vapor and freezing protection.

In accordance with certain preferred embodiments, TEG materials will permit operation of the TEG 102 at a temperature range in the combustion chamber 110 of the instantaneous water heater 100 while meeting design requirements for the efficiency of the TEG 102, power production and lifetime. The TEG 102 heat exchanger design will desirably accommodate the hot side 114 of the heat exchanger into the combustion chamber 110 and absorption of the radiant heat flux from the burner 106. The TEG 102 desirably provides enough power to operate the instantaneous water heater 100 and heat pump compressor 142. The heat pump compressor 142 will desirably operate using power directly from the TEG 102 or from the battery storage/capacitor 124. In accordance with some embodiments, the heat pump may be a standard heat pump, e.g. compression, and can be utilized for high efficiency and low cost. The heat pump can desirably contribute to the water heaters 100 overall efficiency by increasing the efficiency of the best condensing instantaneous water heater from an EF of about 0.95 to at or above about 1.1 EF (with a source COP of greater than about 1.0). This can lead to innovation in the water heating technology that will have significant technical potential for primary energy savings while being cost-effective.

Furthermore, the self-powered gas water heater 100 of this invention can improve the efficiency and reduce the energy costs of residential and commercial buildings. The invention provides a high efficiency water heater with a source COP larger than 1.0 with excess power and ability to operate during a power outage. Compared to state-of-the-art gas-driven water heaters, the subject self-powered instantaneous water heater 100 can achieve acceptable reliability, maintenance intervals, and life expectancies while maintaining similar levels of product safety and low costs of current water heaters.

A typical condensing instantaneous water heater consumes on average about 105 Wh/day of electricity to operate over a 24-hour period. A commercially available TEG generating power during the runtime of a natural gas combustion system can produce greater than 400 Wh/day, vastly exceeding condensing instantaneous water heater power consumption. Up to about 0.66 kWe of excess power in one embodiment of the water heater 100 can be cost-effectively harvested by the TEG 102 directly from combustion products using a gas-to-water TEG heat exchanger while self-powering a natural gas condensing instantaneous water heater using 0.1 kWe of electric power from the TEG. The TEG can produce even more electric power, but cost would increase as well.

As shown in FIG. 2, natural gas heat input of 52.97 kWth is shown as an average for the instantaneous water heater rated at 6-58 kWth heat input. A TEG with an efficiency of 5% would require 13.24 kWth of heat flowing through the TEG 102 element to produce 0.66 kWe of electric power. The subject advanced radiant burner 106 will desirably provide this heat to the TEG 102 heat exchanger in the combustion chamber 110 since the radiative and convective total heat transfer rate from the burner 106 would exceed about 25% of the burner 106 firing rate. Other non-radiant standard burners are typically unable to provide the required heat input to the TEG 102 to generate high power. The heat pump with a COP of 15 would use 0.56 kWe from the TEG 102 and produce 8.43 kWth of hot water in addition to the heat of hot water heated by the burner 106. The other power from the TEG 102 is desirably used to power the water heater 100. The high value of a COP of 15 is achieved due to a low evaporation temperature in a compression cycle of the heat pump. A COP for Carnot efficiency at these conditions would be approximately 60. In comparison with storage heat pump water heaters with a COP of approximately 3.0 (where heat pumps produce hot water of approximately 140° F.), the heat pump for the water heater 100 of the claimed invention will just slightly preheat water by several degrees Celsius. This may be about 6° C. in the subject embodiment. This achieves an ultra-high COP of the subject heat pump and water heater 100. The water heated by the heat pump will then flow through the main heat exchanger and be heated by the combustion products (as shown in FIG. 1) to a set temperature. Since the heat pump also produces cooled air, this air can desirably be used for cooling the exhaust gas from the water heater 100 thus increasing the efficiency of the water heater 100. Considering this power balance, the proposed self-powered instantaneous water heater 100 will achieve a COP of about 1.1 in one such embodiment.

The following components of the subject water heater 100, such as the TEG 102, heat exchangers, and the radiant burner 106 have been developed for different applications including water heaters. Based on these results, it was concluded that a radiant burner with high radiant heat flux can be used in combination with a TEG to maximize power produced by the TEG. In addition, structurally, the TEG 102 can be wrapped around the combustion chamber in the claimed invention. In one embodiment the TEG 102 may be partially wrapped around the combustion chamber 110. In another embodiment the TEG 102 may be completely wrapped around the combustion chamber 110. In yet another embodiment the TEG 102 may be parallel to the burner 106, the TEG 102 may be angled to the burner 106 surface, or any other combination of various TEG positions. In other embodiments of the claimed invention there may be several TEG.

As detailed above, the subject water heater 100 in accordance with a preferred embodiment of this invention employs the TEG 102 device to generate electric energy for self-powered operation and to power the heat pump compressor 142. Compared to current water heaters, such as electric heat pump and natural gas condensing water heaters, the subject water heater 100 has better performance and the ability to operate entirely on natural gas with no need for externally generated electricity. The subject water heater 100 can desirably lead to significant reductions (more than approximately 30%) in building energy consumption.

The present invention provides several advantages and unique features as compared to existing water heaters. The subject self-powered instantaneous water heater 100 can operate during power outages, has or produces ultra-low pollutant emissions, and/or has a source COP greater than 1.0. Other advancements of the water heater in at least one of the embodiments of the subject, invention address common instantaneous issues such as a cold-water sandwich effect and oscillating water temperature swings. Moreover, the water heater of at least one of the embodiments of the subject invention has an increased level of condensation thus exhausting dryer and cooler gas into the atmosphere and eliminating freezing protection of the water heater 100.

The water heater of the present invention provides high efficiency as a retrofit option to all existing gas water heaters and the approximately 9.1 million homes that currently do not use natural gas in water heating, but have natural gas availability. The subject development illustratively disclosed herein suitably may be practiced in the absence of any element, part, step, component, or ingredient which is not specifically disclosed herein.

While in the foregoing detailed description the subject development has been described in relation to certain preferred embodiments thereof, and many details have been set forth for purposes of illustration, it will be apparent to those skilled in the art that the subject development is susceptible to additional embodiments and that certain of the details described herein can be varied considerably without departing from the basic principles of the invention.

What is claimed is:

1. A gas-fired instantaneous water heater comprising:
  a water loop configured to conduct water through the water heater;
  a radiant burner;
  a combustion chamber disposed about the radiant burner, wherein the combustion chamber is exposed to radiation from the radiant burner;
  a thermoelectric generator (TEG) connected to the combustion chamber, wherein a first portion of the water loop extends across a first side of the TEG, the TEG includes a first section configured to receive water of the water loop entering the water heater and a second side of the TEG is disposed toward the radiant burner and heated by the radiant burner, the TEG provides operative power to components of the water heater, and a second portion of the water loop that is downstream from the first portion is heated by the radiant burner to provide heated water.

2. The gas-fired instantaneous water heater of claim 1 further comprising a heat pump in combination with the TEG wherein the TEG is configured to power the heat pump, wherein the heat pump operates on refrigerant and comprises a compressor, wherein the compressor is configured to generate heat, a condenser wherein the condenser is configured to receive water entering the water heater or water from other components of the water heater, an expansion valve configured to lower a pressure of the refrigerant for further heat absorption from ambient air, and an evaporator configured to receive ambient air.

3. The gas-fired instantaneous water heater of claim 1 wherein the TEG at least partially surrounds the combustion chamber.

4. The gas-fired instantaneous water heater of claim 1 wherein the water heater radiant burner has a high power density of up to about 100 W/cm2.

5. The gas-fired instantaneous water heater of claim 1 wherein the water heater radiant burner has a low access air of about 20% or less.

6. The gas-fired instantaneous water heater of claim 1 wherein the water heater has pollutant emissions in NOx of about 5 ppm or less.

7. The gas-fired instantaneous water heater of claim 6 wherein the water heater has pollutant emissions in CO of about 10 ppm or less.

8. A water heater comprising:
  a water loop configured to conduct water through the water heater;
  a radiant burner;
  a combustion chamber disposed about the radiant burner wherein the combustion chamber is exposed to radiation from the radiant burner;
  a thermoelectric generator (TEG) connected to the combustion chamber, wherein the TEG includes a first side configured to receive water of the water loop entering the water heater, a second side of the TEG is heated by the radiant burner, and the TEG provides operative power to components of the water heater, and wherein a second portion of the water loop that is downstream from the first portion and downstream of the TEG is heated by the radiant burner to provide heated water;
  a heat pump in combination with the TEG, wherein the heat pump is configured to heat the water loop upstream of the TEG; and
  a compressor and a condenser wherein the compressor and the condenser are operatively integrated with the heat pump.

9. The water heater of claim 8 wherein the heat pump further comprises an expansion valve and an evaporator configured to receive ambient air.

10. The water heater of claim 9 wherein the heat pump compressor is powered by the TEG.

11. The water heater of claim 8 wherein one or more TEG elements at least partially enclose the combustion chamber.

12. The water heater of claim 11 wherein infrared radiation from the radiant burner heats the TEG.

13. The water heater of claim 8 wherein the TEG produces about 660 We of electric power.

14. The water heater of claim 13 wherein about 100 We of the about 660 We is used for powering the water heater.

15. A method of operating a self-powered water heater, the method comprising:
   introducing a first supply of water to the water heater;
   conducting the first supply of water through a water loop within the water heater;
   heating the first supply of water in the water loop with a heat pump operating in conjunction with the water heater with at least one heating coil;
   transferring the first supply of heated water to a thermoelectric generator (TEG) heat exchanger wherein a natural gas burner integrated with the TEG heat exchanger further heats the first supply of heated water in the water loop resulting in a second supply of heated water, wherein the second supply of water is heated to a higher temperature than the first supply of water; and
   the TEG heat exchanger providing power to components of the water heater.

16. The method of claim 15 further comprising flowing the second supply of heated water in the water loop through a primary heat exchanger for further heating by combustion products, resulting in a third supply of heated water wherein the temperature of the third supply of heated water is greater than the temperature of the second supply of heated water.

17. The method of claim 16 wherein a condensing system downstream from the primary heat exchanger provides a performance of the water heater by transferring heat amongst the first, the second, and the third supply of heated water.

18. The gas-fired instantaneous water heater of claim 1, wherein the second portion of the water loop comprises a heat exchanger including two loop passes over the radiant burner.

\* \* \* \* \*